July 8, 1941.  I. A. TEDDER  2,248,207
FRUIT BRANDING DEVICE OR TOOL
Filed Sept. 12, 1939
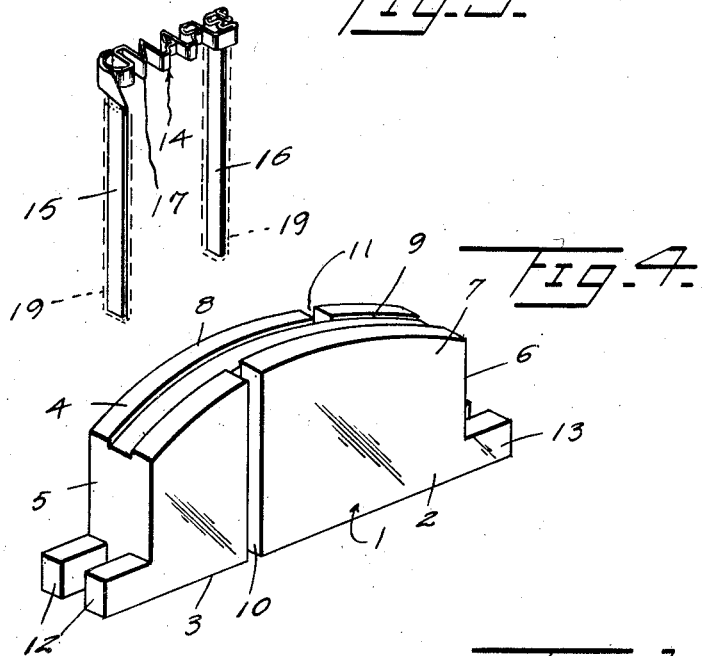
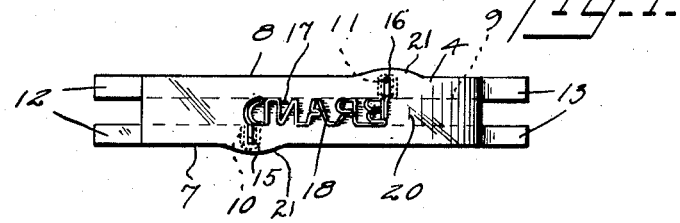
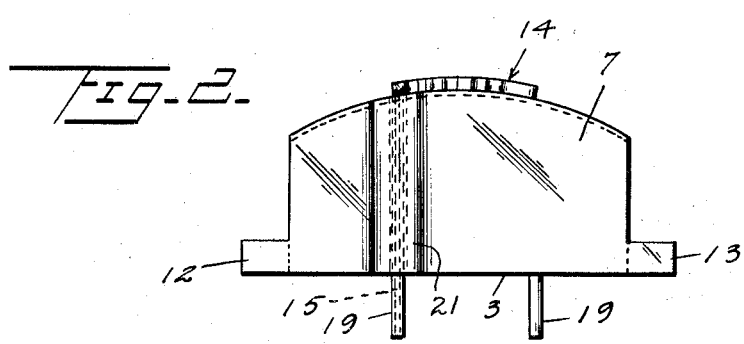
Inventor
IRA A. TEDDER
By Kimmel & Crowell
Attorneys Patented July 8, 1941

2,248,207

UNITED STATES PATENT OFFICE 2,248,207

FRUIT BRANDING DEVICE OR TOOL

Ira A. Tedder, San Benito, Tex.

Application September 12, 1939, Serial No. 294,558

7 Claims. (Cl. 219—30)

This invention relates to a branding tool designed primarily for providing identification indicia upon fruits, such as citrus fruits or the like, but it is to be understood that a branding tool, in accordance with this invention is for employment in any connection for which it may be found applicable.

The invention aims to provide, in a manner as hereinafter set forth, a branding tool by means of which an identifying mark in the form of the name of a brand, a design or other suitable identifying indicia may be expeditiously formed on the periphery of the fruit in such a manner that the indicia cannot be removed without injuring the skin or surface of the fruit.

The invention further aims to provide, in a manner as hereinafter set forth, a branding tool so constructed whereby it may be readily installed with respect to a conveyor apparatus employed in the sizing of fruits without necessitating any undue changes in the structure and at a nominal expense.

The invention further aims to provide, in a manner as hereinafter set forth, a branding tool including an electrically heated marker for applying identification indicia on and by searing the skin of the fruit to the desired depth without impairing or injuring the surface of the fruit and at the same time so setting up the identification indicia relative to the fruit that it cannot be removed from the latter without damaging it to a material extent, whereby it will be readily apparent if the identification indicia has been removed or tampered with and surreptitious indicia substituted therefor.

The invention further aims to provide a branding tool which is simple in its construction and arrangement, strong, durable, thoroughly efficient in its use, expeditious in its action, capable of being readily installed with a conveying apparatus for the fruit to be marked, readily assembled, and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a plan view of the tool illustrating the working face thereof,

Figure 2 is a side elevation of the tool,

Figure 3 is a perspective view of the branding member, and

Figure 4 is a perspective view of the body part of the tool.

The tool includes a holder formed of any suitable material possessing fire resisting and electrical non-conducting characteristics. The holder 1 comprises a body part 2 of substantially rectangular contour in plan having its bottom surface, indicated at 3, squared and its top surface, indicated at 4, of arcuate contour. The body part 2 includes end surfaces 5, 6 which are of squared contour and side surfaces 7, 8 which also are of squared contour.

The surface 4 centrally and lengthwise thereof is formed with an arcuate groove 9 extending from the surface 5 to the surface 6. The groove 9 opens at the surfaces 5, 6. The side surface 7 of the body part 2, between its transverse median and the surface 5 is formed with a vertical groove 10 extending from surface 3 to surface 4 and opening at its outer end terminal portion into one side of the groove 9. To provide for the opening of the groove 10 into the groove 9 the upper end terminal portion of the base wall of groove 10 is cut out. The groove 10 has its ends opening at the surfaces 3 and 4. The side surface 8 of the body part 2 between its vertical median and the surface 6 is formed with a vertical groove 11 extending from the surface 3 to the surface 4 and opening at its outer end terminal portion into the other side of the groove 9. The opening of the groove 11 into the groove 9 is provided for by removing the upper end terminal portion of the base wall of the groove 11. The ends of the groove 11 open at the surfaces 3, 4.

The holder 1 includes two oppositely extending pairs of spaced parallel lugs of like form adapted to coact with a coupling or attaching means, not shown for suitably installing the tool in active position relative to a conveying structure for the fruit, such by way of example as is disclosed by my co-pending application, Serial No. 294,557, filed September 12, 1939. The lugs of one pair are indicated at 12 and those of the other pair at 13. The lugs 12 are extended laterally from and merge at their inner ends into the surface 5 of the body part 2. The lugs 12 are flush with the surfaces 3, 7, 8. The lugs 13 extend laterally from and merge at their inner ends into the surface 6 of the body part 2. The lugs 13 are flush with the surfaces 3, 7, 8. The lugs 12, 13 are of rectangular contour and are of materially less height than the height of the body part 2.

The tool includes an electrically heated member 14, which may be termed a marking member and its purpose is to apply, by searing the desired identification indicia on the surface of the fruit. The indicia, when applied is to extend into the skin of the fruit to a depth whereby it cannot be removed without impairing the surface of the fruit to an extent to make it quickly discernible that the original indicia has been tampered with. The member 14 is to be secured to the holder 1 in extended relation with respect to the surfaces 3, 4 of the body part 2. The member 14 will be constructed of chromel or other suitable electrical resisting material. The member 14 is formed from a suitable length of electrical resisting material of strap-like form and it is of substantially U-shaped contour. The member 14 includes a pair of arms 15, 16 and a bight 17 which connects the arms 15, 16 together. The said arms 15, 16 are disposed in offset relation with respect to each other and offset laterally in opposite directions with respect to a side of the ends of the bight 17. The latter will be bent in a manner to form the identification indicia desired, a facsimile of which is to be seared in the fruit. By way of example, such indicia is set up as consisting of the word "Brand," as indicated at 18. It is to be understood, however, that the bight 17 is to be formed in the manner to constitute the identification indicia desired other than the word "Brand." The bight 17 after being bent to form the identification indicia is disposed on one of its lengthwise edges whereby the letters forming such indicia will be disposed in parallel planes parallel to the planes of the arms aforesaid.

The arms 15, 16 are encased throughout by metallic casings 19, preferably copper. The casings 19 extend from the free ends of the arms to the bight 17. The said casings 19 are adapted to be electrically connected to an electrical heating circuit, not shown for electrically connecting such circuit with the member 14.

The arms 15, 16 with the casings 19 thereon are to be mounted in and extended from the grooves 10, 11 respectively and the bight 17 is to be arranged within and in extended relation with respect to the groove 9. The height of the bight 17 is greater than the depth of groove 9. The latter is to be filled with cementitious material 20 preferably prior to the positioning of the bight 17 in the groove 9. When the cementitious material 20 has been packed in the groove 9, the inner portion of the bight 17 is extended through the material 20 and seats against the base wall of the groove 9. The outer portion of the bight 17 is disposed in projecting relation with respect to the surface 4 of the body part 2 and such outer portion is employed for searing a facsimile of the identification indicia in the fruit. When the bight 17 is arranged in the groove 9 it is bent in the manner so as to conform to the curvature of such groove. The arms 15, 16 with the casings 19 thereon, are extended through the groove 10, 11 and when so extended will shift the bight to its position in the groove 9. After the arms 15, 16 are arranged in the grooves 10, 11, a body of cementitious material 21 is packed in said grooves 10, 11 and against the surfaces 7, 8 of the body part 2. When the cementitious materials 20, 21 become set the member 10 is fixedly secured to the body part 10 and is prevented from shifting relative to the latter.

What I claim is:

1. A branding tool comprising a heat resisting and a non-electrical conducting body part, an electrically heated electrical resisting marker member including an identification indicia searing portion merging into corresponding ends of a pair of arms, said portion having inner and outer parts, said inner part extended in and said outer part projecting from a surface of said body part, said arms disposed substantially at right angles to said portion, having a part mounted in and their remaining part projected from another surface of said body part, means for embedding and securing the non-projected part of said portion and the non-projected part of the said arms in and to said body part, that surface of said body part from which said portion extends being formed with a groove for receiving the inner part of such portion, said body being formed with grooves disposed substantially at right angles to the other of said grooves and through which said arms extend, and the means for securing said portion and arms to said body part being arranged in and sealing up the said several grooves.

2. A branding tool comprising a heat resisting and non-electrical conducting body part including a surface of arcuate contour formed lengthwise thereof with an arcuate groove and a pair of side surfaces formed with grooves communicating at one end with opposite sides of the said other groove, an electrically heated electrical resisting marker member including an identification indicia searing portion mounted in and extended from said arcuate groove and a pair of arms having corresponding ends merging into the ends of said portion, said arms being extended through the grooves in said side surfaces and connecting with said portions at the points of communication between said arcuate groove and the said other grooves, and means mounted on the said several grooves for securing said member to said body part.

3. A branding tool comprising a heat resisting and non-electrical conducting body part including a surface of arcuate contour formed lengthwise thereof with an arcuate groove and a pair of side surfaces formed with grooves communicating at one end with opposite sides of the said other groove, an electrically heated electrical resisting marker member including an identification indicia searing portion mounted in and extended from said arcuate groove and a pair of arms having corresponding ends merging into the ends of said portion, said arms being extended through the grooves in said side surfaces and connecting with said portions at the points of communication between said arcuate groove and the said other grooves, and means mounted on the said several grooves for securing said member to said body part, said arms being disposed in offset relation with respect to each other and in offset relation with respect to the said portion.

4. A branding tool comprising a heat resisting and non-electrical conducting body part including a surface of arcuate contour formed lengthwise thereof with an arcuate groove and a pair of side surfaces formed with grooves communicating at one end with opposite sides of the said other groove, an electrically heated electrical resisting marker member including an identification indicia searing portion mounted in and extended from said arcuate groove and a pair of arms having corresponding ends merging into the ends of said portion, said arms being extended through the grooves in said side surfaces and connecting with said portions at the points of communication between said arcuate groove and the said other grooves, means mounted on the said several grooves for securing said member to said body part, said portion being disposed lengthwise of and conforming in contour to the contour of said arcuate groove, and said grooves in said side surfaces being disposed in offset relation with respect to each other.

5. A branding tool comprising a heat resisting and non-electrical conducting body part including a surface of arcuate contour formed lengthwise thereof with an arcuate groove and a pair of side surfaces formed with grooves communicating at one end with opposite sides of the said other groove, an electrically heated electrical resisting marker member including an identification indicia searing portion mounted in and extended from said arcuate groove and a pair of arms having corresponding ends merging into the ends of said portion, said arms being extended through the grooves in said side surfaces and connecting with said portions at the points of communication between said arcuate groove and the said other grooves, means mounted on the said several grooves for securing said member to said body part, said portion being disposed lengthwise of and conforming in contour to the contour of said arcuate groove, and said grooves in said side surfaces being disposed in offset relation with respect to each other, said arms being disposed in offset relation with respect to each other and in offset relation with respect to the said portion.

6. A branding tool comprising a heat resisting and non-electrical conducting body part including a surface of arcuate contour formed lengthwise thereof with an arcuate groove and a pair of side surfaces formed with grooves communicating at one end with opposite sides of the said other groove, an electrically heated electrical resisting marker member including an identification indicia searing portion mounted in and extended from said arcuate groove and a pair of arms having corresponding ends merging into the ends of said portion, said arms being extended through the grooves in said side surfaces and connecting with said portions at the points of communication between said arcuate groove and the said other grooves, means mounted on the said several grooves for securing said member to said body part, and said body part having end surfaces each provided with a pair of spaced parallel laterally extending attaching lugs.

7. A branding tool comprising a heat-resisting and non-electrical conducting body part having an outer end and a pair of sides, said body part being formed in its outer end with an end groove and in each side with a side groove, said side grooves being non-aligned and at their outer ends communicating with the end groove at opposite sides of the latter, a one-piece electrically heated electrical resisting marker member of strap-like form including an identification indicia searing portion having an inner lengthwise edge seated on the bottom of said end groove, said portion being extended from the outer end of said body part, said member including a pair of arms disposed within and having lengthwise edges seated against the base walls of said side grooves, said arms having their outer ends extending into said end groove at the points of communication of the latter with the side grooves and merging into the ends of said portion, and means engaging with the walls of the said several grooves for fixedly securing said member to said body part.

IRA A. TEDDER.